H. T. YARYAN.
Apparatus for Extracting Oils.
No. 220,203. Patented Sept. 30, 1879.
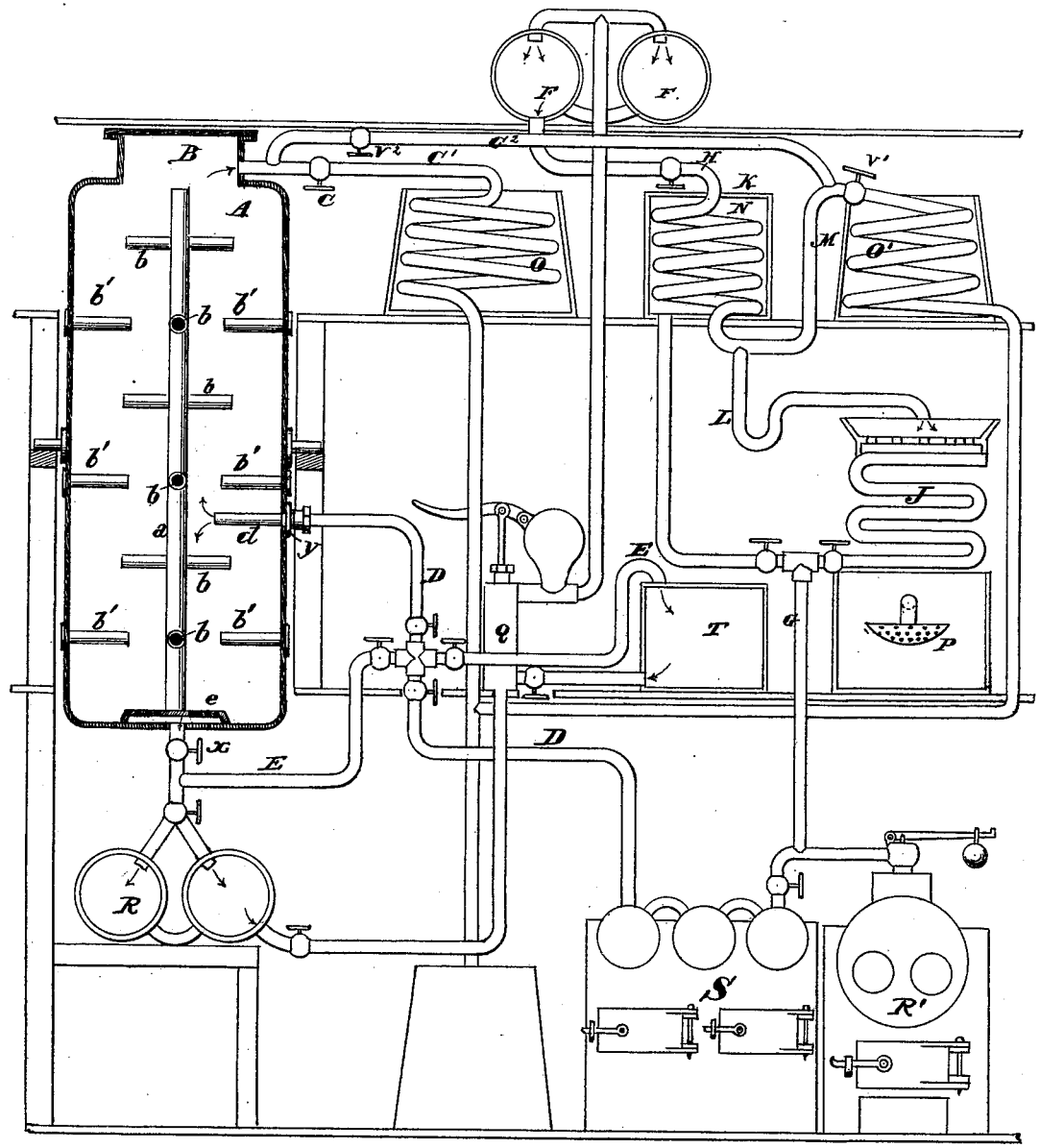

UNITED STATES PATENT OFFICE.

HOMER T. YARYAN, OF RICHMOND, INDIANA.

IMPROVEMENT IN APPARATUS FOR EXTRACTING OILS.

Specification forming part of Letters Patent No. 220,203, dated September 30, 1879; application filed March 8, 1879.

*To all whom it may concern:*

Be it known that I, HOMER T. YARYAN, of Richmond, Wayne county, Indiana, have invented certain new and useful Improvements in Apparatus for the Extraction of Oils from Vegetable and other Substances, of which the following is a full, clear, and exact description, reference being had to the accompanying drawings, illustrating the same and forming part of this specification.

My present invention is in the nature of improvements upon the apparatus for which Letters Patent of the United States were granted and issued to me, dated June 25, 1878, and numbered 205,328.

The invention consists in the combination, with a percolator for containing the meal from which the oil is to be extracted, of a standard having horizontal arms at different elevations for supporting the meal, which standard and arms may be made hollow and connected with a steam-generator, in order to supply steam to the meal, as more fully hereinafter specified; also, in the combination, with the percolator, of certain pipes connected with the apparatus for distilling the mixed oil and solvent, whereby the vapors of the solvent are conveyed to the percolator, as more fully hereinafter specified.

My invention will be the more readily understood from the following description, which, in connection with the drawings, embodies a recapitulation of the substance of my former invention, and shows the parts and improvements to which the present specification relates.

The drawings exhibit a tank or percolator, A, connected by suitable pipes with tanks R, for the collection of the oil and solvent after digestion of the meal, and with a steam-boiler, R', and superheater S, from which superheated steam is introduced into the meal after drawing off the solvent, for purifying the meal from the traces of the solvent; also, with condenser O, for the recovery of the solvent vaporized in the percolator. The receiving-tank R is also suitably connected with a similar elevated receptacle, F, into which the oil and solvent are forced by pump U, whence it flows downward through the coil N within the steam-drum K, by which the solvent is vaporized and separated from the oil, the vaporized solvent rising to the condenser O' and the oil passing to the ultimate receiving-tank P. These are the essential features of the apparatus described in my former patent, before referred to, so far as necessary to the understanding of my present improvements.

The operation therein described, which has been already indicated in the foregoing reference to the apparatus, consisted, essentially, in the introduction of superheated steam to the meal in the percolator after the solvent had been drawn off, for the purpose of vaporizing, separating from the meal, and driving off the remaining traces of the solvent.

In the further practical use of my former invention I have ascertained that the working of the process of extracting the oil and cleaning the meal may be facilitated and more perfect results attained by my present improvements in the apparatus, which I will proceed to point out and explain in detail.

For introducing the hydrocarbon-vapor into the meal I make use of the partial vacuum formed in the percolator by the act of drawing off the solvent. I employ an additional pipe, $C^2$, through which the hydrocarbon vapor is allowed to flow into the upper part of the percolator A as the liquid solvent is being drawn off below. A convenient mode of supplying the vapor is to connect the pipe $C^2$ with the pipe $C^1$ near the percolator and with the vapor-pipe M. Suitable valves to close the communication with condenser O' and to open communication with the percolator through $C^2$ being provided, the partial vacuum formed in the percolator A, by allowing the liquid solvent to flow out below through the lower exit, $x$, is supplied by the hydrocarbon vapor formed in the coil N, issuing through the pipes M and $C^2$, as stated. This vapor, being at a comparatively high temperature, gradually heats the mass of meal, so that by the time the liquid solvent finally ceases to flow out at $x$ the mass of meal is thoroughly heated and permeated with the vapor. In this condition of the meal the subsequent action of the steam is greatly facilitated, from the fact that condensation of the steam is greatly lessened and the separation of the solvent more easily effected.

In the use of my former invention a difficulty was found to exist in the tendency of the meal, under the described conditions of treatment, to settle and pack together, and so prevent or interfere with the thorough penetration of the superheated steam through the mass of meal. The improvement before described in the mode of treatment affords a partial remedy, by avoiding the condensation of water in the meal, to which this was partly due. The partial condensation of the hydrocarbon vapor, however, produces a similar result in a lesser degree; and the improvement in the apparatus I am about to describe, whose object is to prevent the settling and packing of the meal and to obtain a more thorough penetration of the steam, therefore produces the same kind of benefit in either case.

To this end I introduce into the percolator an upright standard, $a$, carrying lateral arms $b\,b$ or radial bars set at right angles to each other at convenient points. The standard $a$ has a perforated bottom, $c$, which rests upon the bottom of the percolator and maintains the standard in an upright position at the center of the percolator. When the meal, which is put into the percolator and covers and surrounds the standard $a$ and its radial arms, is subjected to the described treatment the loss of its oil causes the mass to shrink and settle downward by its gravity. The radial arms $b$, however, tend to sustain it and prevent the settling and packing of the mass, and so preserve the penetrable condition favorable to the action of the steam subsequently introduced.

The standard $a$ and arms $b$ may be made of wrought-iron gas-pipes, suitably connected and arranged to admit steam at the bottom, which passes into the percolator through the lower opening, $x$. By this means the standard $a$ and arms $b$ act as distributers of the steam in the final operation of purifying the meal. When so used suitable check-valves should be provided in the arms $b$, to prevent the backward flow of solvent at other times.

Instead of or in connection with the standard and radial arms, short arms $b'$, inserted through the side of the percolator at various points, may be used. These may be also of short sections of pipe and used as steam-nozzles, suitable connections being provided for that purpose.

It will be apparent that the standard $a$ may be suspended from the top, instead of resting upon the bottom; also, that perforated platforms or grates may be used in the place of the radial arms $b$.

Having described my invention, what I claim, and desire to secure by Letters Patent, is—

1. In combination with the percolator A, the standard $a$, provided with horizontal arms $b$ at different elevations, whereby the mass of meal is prevented from settling and packing, substantially as specified.

2. In combination with the percolator A, the vapor-pipe $C^2$ and a suitable connecting-pipe, the pipe M, the vaporizing-coil N, the reservoir F, containing the mixed oil and solvent, whereby the heated vapor of the hydrocarbon escaping during the separation of the solvent from the oil is supplied to the percolator and utilized, substantially as specified.

In testimony whereof I have hereunto set my hand.

HOMER T. YARYAN.

Witnesses:
E. A. ELLSWORTH,
L. M. HOSEA.